April 1, 1958
J. E. HUNT
2,828,983
SECTIONAL ROTARY SEAL WITH RADIALLY
CONTACTING SEALING SURFACES
Filed Jan. 18, 1954
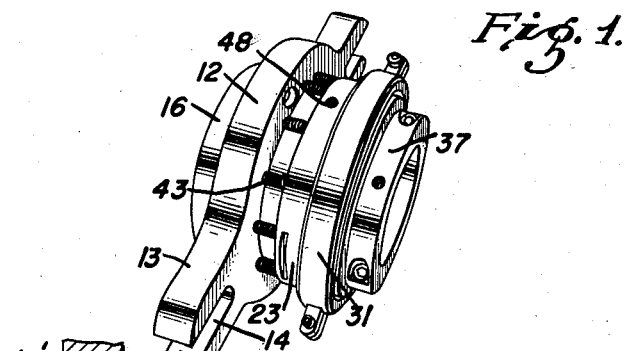
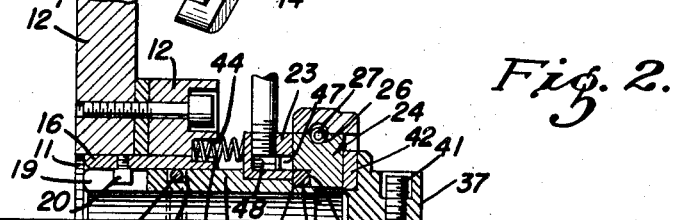
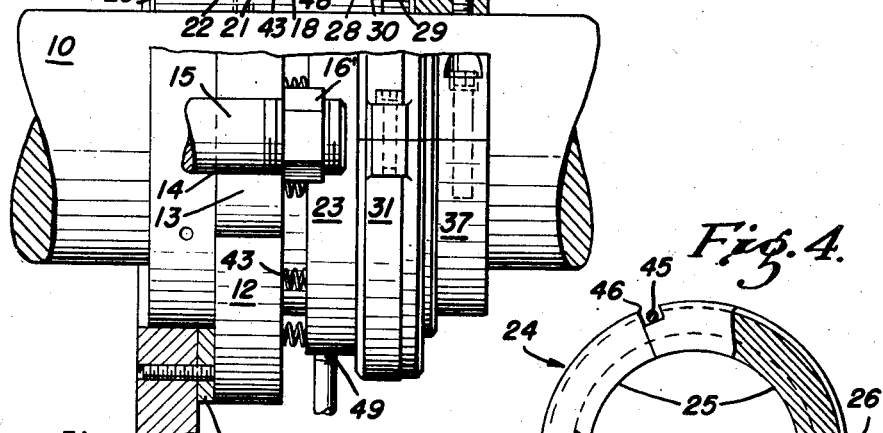
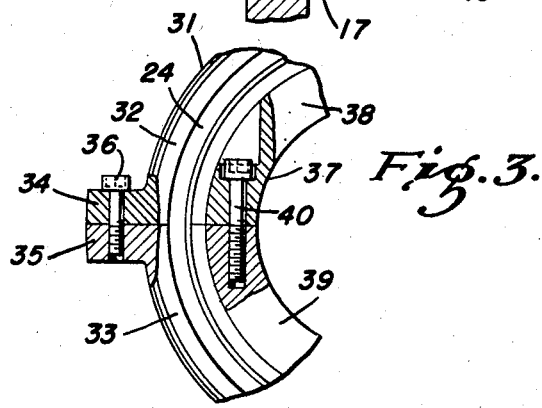
JAMES E. HUNT
INVENTOR.
BY *[signature]*
Attorney

United States Patent Office 2,828,983
Patented Apr. 1, 1958

2,828,983

SECTIONAL ROTARY SEAL WITH RADIALLY CONTACTING SEALING SURFACES

James E. Hunt, El Segundo, Calif.

Application January 18, 1954, Serial No. 404,591

4 Claims. (Cl. 286—9)

The present invention relates generally to a sealing gland structure and is more particularly concerned with a shaft seal which is especially useful for the sealing of fluid moving device shafts, such as pumps of the rotating type.

Heretofore, it has been conventional practice in fluid pumps of the rotary type to provide shaft seals, where the shafts pass through the pump housing, which are positioned internally of the housing.

Such construction has proved unsatisfactory, particularly in the pumping of corrosive liquids such as acids, hydrocarbons and the like since the materials of the seal are subjected to corrosion and similar damaging effects of the pumped fluid or liquid.

Moreover, in the conventional constructions seal leakage has necessitated shutting down of the pump and an expensive disassembly operation of the housing in order to get at the seal and correct the difficulties. Such shutdowns, for example, in the case of pumps for hydrocarbon fluids being pumped from ships or the like becomes uneconomical and exceedingly expensive.

Having in mind the foregoing disadvantages attending conventional pump constructions, it is an object of the present invention to provide a simple shaft seal construction which is susceptible of replacing the usual type of seal, and wherein the seal is positioned outside the housing where the parts are readily accessible and visible at all times, and wherein biasing springs and other essential parts of the seal are out of contact with the pumped fluid or liquid.

Another object is to provide a simplified shaft seal construction for a rotary pump in which the sealing rings are readily accessible and removable for replacement or repair, without the necessity of having to dismantle the pump housing.

Still another object is to provide novel means for keeping the sealing rings cooled during operation.

Briefly the invention comprises an axially movable structure or carriage for supporting a non-rotatable ring, such as a carbon ring. The carbon ring is associated with a metal ring of suitable alloy which is carried by and secured to the rotating shaft. The rings are held in pressure contact by means of compression springs which are mounted outside the housing out of contact with the pump fluid. The sealing rings are further arranged so that they may be removed in sections for replacement or repair without the necessity of having to dismantle the pump housing.

Further objects of the invention will be brought out in the following part of the specification, wherein detailed description is for the purpose of fully disclosing the invention without placing limitations thereon.

Referring to the accompanying drawings, which are for illustrative purposes only:

Fig. 1 is a perspective view of a pump shaft seal embodying the features of the present invention;

Fig. 2 is a view in elevation of the shaft seal shown in Fig. 1, a longitudinal section being taken through the assembled structure in order to show the cooperative relationship of the associated parts;

Fig. 3 is an enlarged fragmentary view, partly in section, showing the interconnections between the sections of the retainers for the sealing rings; and Fig. 4 is a face view showing the details of construction of the carbon sealing ring, a portion being cut away and sectioned to show details of construction.

Referring generally to the drawings, for illustrative purposes, the shaft seal assembly as generally indicated in Fig. 1, is shown in Fig. 2 as being associated with a fluid pumping device embodying a rotatable shaft 10 which projects through a shaft opening 11 in a housing wall 12' of a fluid pump of the rotary type, which may be of conventional construction.

More specifically, the shaft seal comprises a gland 12 such as usually utilized with conventional packings, the gland having oppositely extending wings 13 which are slotted as shown at 14 for the reception of securing bolts or studs 15, the outermost ends of these studs being threaded for receiving an associated nut 16'. In this case, however, the gland is provided with a tubular sleeve 16 which may be integrally formed with the gland or may be separately formed and welded thereto. The sleeve 16 is of such outer diameter as to guidingly fit within the housing opening 11, when the gland is secured to the housing by the bolts or studs 15, a sealing gasket 17 being interposed between the gland and the associated adjacent housing surface to prevent leakage from the housing.

The sleeve 16 is thus arranged to provide a cylindrical guide for a floating cylindrical bushing 18 which is axially slidable within the sleeve 16. The innermost end of the bushing 18 is provided with an end slot 19 within which is positioned a stationary guide pin 20 which is fixedly mounted on the sleeve 16 and projects inwardly. This guide pin permits axial movement of the bushing, but supports it against rotational movement. Between the ends of the bushing 18, the bushing is provided with a circumferentially extending groove 21 which is adapted to receive a sealing O-ring 22 which prevents leakage along the outer surface of the bushing and the associated inner-surface of the sleeve 16.

Adjacent the outermost end of the bushing 18, there is provided a circumferentially extending collar 23 which may be integrally formed, or separately formed as shown and welded to the bushing 18. The collar 23 forms an abutment for a carbon sealing ring 24 which is formed from a plurality of arcuate sections 25, as shown in Fig. 4, placed in end to end relation. The sections 25 are provided with peripheral circumferentially extending grooves 26 which cooperate to form a channel within which there may be positioned a coiled retaining spring 27. As shown, the associated edges of the bushing 18 and sealing ring 24 are cut out to form cooperatively associated edge grooves 28 and 29 which cooperate to receive a sealing O-ring 30 of a sealed joint between the bushing 18 and sealing ring 24.

Referring to Fig. 3, the sealing ring 24 is retained in position by a split retainer 31 formed of semicircular sections 32 and 33 having abutment jointure flanges 34 and 35 adapted to be secured together by a bolt 36 in each case.

Referring again to Fig. 2, there is provided a shaft collar 37 which is likewise formed of semicircular sections 38 and 39 which are arranged to be secured together at their abutting ends in each case by a suitable connecting bolt 40, as shown in Fig. 3. This collar is secured to the shaft by conventional means, in this case as by a set screw 41. The collar 37 is provided with an annular ring facing 42 of suitable material, for example, a cobalt-chromium alloy. The ring facing 42 is in confronting relation with an end surface of the sealing ring 24 and is held in pressure contact engagement therewith by means of a plurality of compression coiled springs 43 which are positioned in circumferentially spaced relation around the bushing 18, these springs in each case having one end seated in a socket 44 formed in the face of the gland 12, the other end of the spring bearing against the confronting end face of the collar 23. These springs coact to move the bushing 18 together with the sealing ring 24 thereon in a direction towards the collar 37 so as to maintain the sealing ring 24 and ring facing 42 in pressure contact engagement.

The sealing ring 24 assembly is retained against rotational movement by means of a pin 45 which is mounted on the collar 23 in a suitable position to project into a peripheral notch 46 of the ring 24, as shown in Fig. 4.

Provision is further made for cooling the sealing rings. This is accomplished by providing an end opening circumferentially extending groove 47, as shown in Fig. 2 in the collar 23, this groove communicating with a supply inlet connection 48 at the top of the collar 23 for a cooling medium. An outlet connection 49 for the cooling medium is provided at the bottom of the collar 23 for carrying off the cooling medium. Flow of the cooling medium through the groove 47 conducts the cooling medium into heat transfer relation with the sealing ring 24 and associated parts of the assembly which may become heated during operation.

It is believed that it will be readily apparent that the sealing rings 24 and 42 may be readily disassembled for inspection, replacement or repair in a simple expedient manner without the necessity of having to disassemble the pump housing in order to get at the sealing parts as would be necessary in conventional arrangements. Disassembly of the shaft seal of the present invention may be accomplished quickly and economically, and the construction is simple in design but most effective in preventing leakage of the pump fluids or liquids along the shaft.

Various modifications may suggest themselves to those skilled in the art without departing from the spirit of my invention, and, hence, I do not wish to be restricted to the specific form shown or uses mentioned, except to the extent indicated in the appended claims.

I claim:

1. A fluid seal structure for a shaft extending through an opening in a housing of a fluid moving device and so arranged that parts surrounding the shaft cannot be withdrawn over an end thereof, the seal structure being external of the housing and comprising: a gland surrounding said shaft; means for securing said gland in sealed relation to the adjacent housing; a floating bushing surrounding said shaft and supported for axial guided movements in said gland; means for sealing said bushing with respect to said gland; a sectionalized carbon ring; a retainer removably securing said carbon ring to said bushing; a member sealing said ring with respect to said bushing; a split collar removably secured to said shaft and having a metallic facing adapted to bear against said carbon ring, said carbon ring and said split collar being positioned outwardly of said gland and upon disassembly being laterally removable from the shaft for replacement; means biasing said carbon ring and said metallic facing towards each other to effect pressure contact therebetween; a fluid flow channel in said bushing adjacent said carbon ring; and means for circulating a cooling medium through said flow channel.

2. A fluid seal structure for a shaft extending through an opening in a housing of a fluid moving device and so arranged that parts surrounding the shaft cannot be withdrawn over an end thereof, the seal structure being external of the housing and comprising: a gland surrounding said shaft; means for securing said gland in sealed relation to the adjacent housing; a floating bushing surrounding said shaft and supported for axial guided movements in said gland; means for sealing said bushing with respect to said gland; a sectionalized carbon ring positioned outwardly of said gland in an axial direction on said shaft; a retainer removably securing said carbon ring to said bushing; a member sealing said ring with respect to said bushing; a split collar removably secured to said shaft and having a metallic facing of cobalt-chromium alloy adapted to bear against said carbon ring; means biasing said carbon ring and said metallic facing toward each other to effect pressure contact therebetween; and means for circulating a cooling medium in heat exchange relation with said carbon ring.

3. A fluid seal structure for a shaft extending through an opening in a housing of a fluid moving device and so arranged that parts surrounding the shaft cannot be withdrawn over an end thereof, the seal structure being external of the housing and comprising: a gland surrounding said shaft; means for securing said gland in sealed relation to the adjacent housing; a floating bushing surrounding said shaft and supported for axial guided movements in said gland; means for sealing said bushing with respect to said gland; a sectionalized carbon ring; a sectional retainer removably securing said carbon ring to said bushing; a member sealing said ring with respect to said bushing; a split collar removably secured to said shaft outwardly of said gland and having a metallic facing adapted to bear against said carbon ring; and means biasing said carbon ring and said metallic facing towards each other to effect pressure contact therebetween, said carbon ring and split collar being removable for replacement, without disassembly of said shaft from the fluid moving device.

4. A fluid seal structure for a shaft extending through an opening in a housing of a fluid moving device and so arranged that parts surrounding the shaft cannot be withdrawn over an end thereof, the seal structure being external of the housing and comprising: a gland surrounding said shaft; means for securing said gland in sealed relation to the adjacent housing; a floating bushing surrounding said shaft supported for axial guided movements in said gland and having an outer end projecting beyond said gland; means for sealing said bushing with respect to said gland; a sectionalized carbon ring; a retainer removably securing said carbon ring to the projecting end of said bushing; a member sealing said ring with respect to said bushing end; a split collar removably secured to said shaft and having a metallic facing adapted to bear against an outer face of said carbon ring; and springs for biasing said carbon ring outwardly towards said split collar, one end of each spring bearing against said gland and the other end acting against said carbon ring, said split collar, carbon ring and retainer being removable without disassembly of the other elements of said sealed structure.

References Cited in the file of this patent

UNITED STATES PATENTS

| | | |
|---|---|---|
| 811,642 | Key | Feb. 6, 1906 |
| 1,097,074 | Bennett | May 19, 1914 |
| 1,294,620 | Clarke | Feb. 18, 1919 |
| 1,460,764 | Nielsen et al. | July 3, 1923 |
| 2,040,429 | Corke | May 12, 1936 |
| 2,247,505 | Kohler | July 1, 1941 |
| 2,433,589 | Adams | Dec. 30, 1947 |
| 2,567,809 | Greiner | Sept. 11, 1951 |
| 2,628,852 | Voytech | Feb. 17, 1953 |

FOREIGN PATENTS

| | | |
|---|---|---|
| 909,976 | France | Jan. 14, 1946 |